Figure 1:
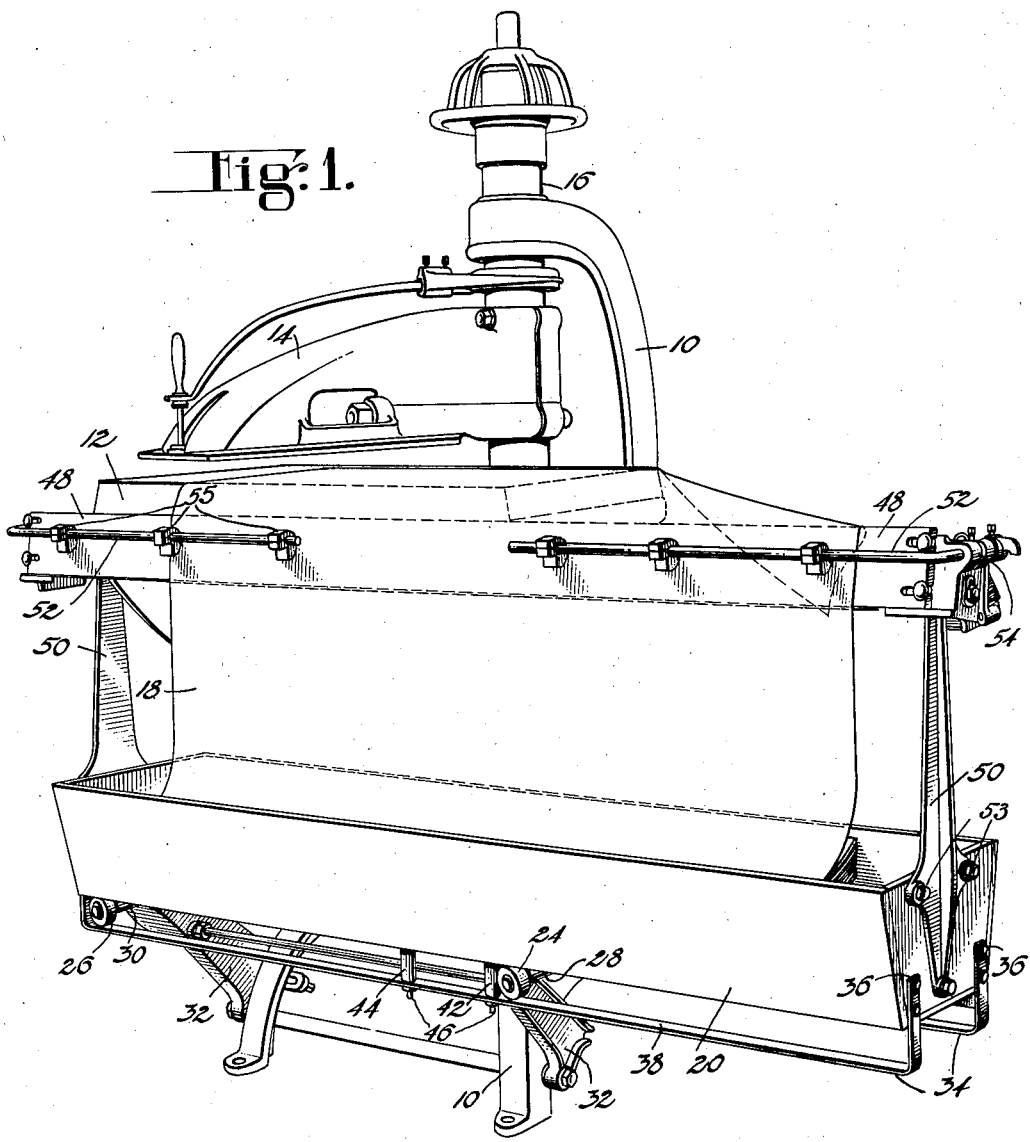

Feb. 13, 1940. L. B. HOOPER 2,189,797
MACHINE FOR OPERATING ON SHEET MATERIAL
Filed Oct. 14, 1937

INVENTOR:
Lester B. Hooper
By his Attorney
Harlow Jos. Davis

Patented Feb. 13, 1940

2,189,797

UNITED STATES PATENT OFFICE 2,189,797

MACHINE FOR OPERATING ON SHEET MATERIAL

Lester B. Hooper, Beverly, Mass., assignor to United Shoe Machinery Corporation, Borough of Flemington, N. J., a corporation of New Jersey Application October 14, 1937, Serial No. 168,917

2 Claims. (Cl. 164—25)

This invention relates to machines for operating upon sheet material and is herein illustrated as embodied in a clicking machine of the type disclosed in United States Letters Patent No. 921,503, granted May 11, 1909, upon an application filed in the name of Arthur Bates.

It is an object of the invention to provide in a machine of the type referred to improved means for facilitating operation upon materials of greater width than the bed of the machine. To this end, and as shown, I have provided a carriage arranged to receive and support the body portion of sheet material to be operated upon, an apron of greater width than the bed secured to the carriage for supporting an end portion of the material extending over the apron and bed, together with means for clamping the end portion of the material throughout its entire width in fixed position heightwise of the bed, the carriage being movable on rollers across the front of the machine in positioning different portions of the material upon the bed.

This construction facilitates the handling of the material since the latter will rest evenly upon the bed without wrinkles and there is little or no tendency of the material to drag as it is shifted over the surface of the bed.

Other objects and features of the invention are disclosed in the accompanying drawing and in the following detailed specification and are pointed out in the appended claims.

Figure 2:
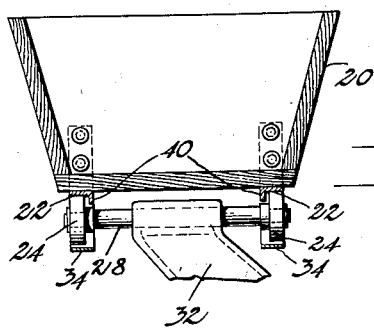

In the drawing,

Fig. 1 is a perspective view of a clicking machine having embodied therein a cloth carriage constructed in accordance with my invention; and Fig. 2 is a view in cross section of the carriage and its supporting structure.

As shown in Fig. 1, the machine comprises a frame 10 carrying a cutting bed or block 12 and a presser arm 14 mounted upon a vertical spindle 16 for movement angularly about the axis of the spindle transversely across the block and movable heightwise with the spindle toward or away from the cutting block 12, the presser arm 14 being constructed and arranged to operate upon dies to form blanks from sheet material such as cloth 18 positioned upon the cutting block 12. For a more complete description of the parts thus far described and their operation reference may be had to the above mentioned Letters Patent No. 921,503.

In order to support the body portion of material to be operated upon, for example, a bolt of cloth, I have provided a carriage comprising a trough 20, preferably made of wood, which is mounted upon the lower forward portion of the machine frame 10 and extends across the front of the machine parallel to the forward edge of the cutting block 12. The trough is provided with tracks in the form of angle irons 22 (Fig. 2) secured to the bottom thereof and extending lengthwise of the trough. These angle irons rest upon rollers 24 and 26 carried by shafts 28 and 30 mounted in brackets 32 upon the frame 10. The trough 20 carries two guard rails 34 secured to the ends of the trough by bolts 36 and having portions 38 spaced from the bottom of the trough and extending lengthwise thereof beneath the rollers 24 and 26 to prevent displacement of the trough in a heightwise direction. The inner flanged portions 40 of the angle irons 22 prevent lateral displacement of the trough from the rollers and guide the trough in its movements. This arrangement is such that the trough can be moved back and forth across the front of the machine as required to present different portions of sheet material to the cutting surface of the block 12.

The lateral movement of the trough is limited by stops comprising sleeves 42 and 44 which are secured between the bottom of the trough 20 and the forwardly extending guard rail 38 by means of bolts 46. As shown in Fig. 1, the stop 42 is arranged to engage the forward roller 24 to limit movement of the trough to the right in the figure, and the stop 44 is adapted to engage the forward roller 26 to limit movement of the trough to the left.

Means is provided for holding the free end of the cloth in position upon the cutting block 12 against the pull of the bight of the cloth which tends to drag the free end off the cutting surface. To this end there is provided an apron 48 which extends along the forward edge of the cutting block 12 at an inclination to the work supporting face of the block and which is supported by two upstanding brackets 50 secured by bolts 53 to the ends of the trough. The brackets 50 carry rods 52 which normally extend along the inclined face of the apron and are rotatably mounted in bearings 54 for angular movement in a vertical plane intersecting the apron. The rods are provided with curved work engaging members 55 which are operative to clamp or wedge the material against the inclined face of the apron under the weight of the rods and members. Thus, the material is maintained in position on the block 12 against the downward pull of the bight thereof. However, when the material is pulled upwardly over the apron the members 55 are raised slightly by friction releasing the clamp-pressure. It is to be noted that the trough 20 and the apron 48 are approximately twice as wide as the cutting block 12 so that cloth of greater width than that of the cutting block can be supported in the trough and held securely in position on the apron. That portion of the apron which extends beyond the side of the cutting block when the trough is in either of its extreme positions serves to support that part of the end portion of the material not positioned upon the block and prevents drag of the material when the trough is moved laterally.

In the operation of the machine material of greater width than the cutting block 12 is placed in the trough 20 and the end of the material is brought up over the apron 48 and into position upon the surface of the cutting block, the material being clamped in fixed position heightwise of the block by the clamping members 52. At this time the trough is moved on the rollers 24 and 26 into such position that approximately half of the full width of the material is positioned upon the block 12. The operator then performs cutting operations upon the surface of the material resting upon the block after which the trough and apron with the material clamped in position are moved laterally to present the remaining portion of the width of material to the cutting surface. Cutting operations are then performed on the freshly presented material after which a further length of the material is drawn up over the apron and the cycle of operations is repeated.

Having described my invention, what I claim as new and desire to secure by Letters Patent of the United States is:

1. A machine for operating upon sheet material comprising a frame, a cutting bed carried by the frame, rollers mounted upon the frame, a carriage for sheet material of greater width than the cutting bed and mounted upon the rollers for movement along the front of the machine, stop members on the carriage arranged to engage the rollers for limiting movement of the carriage in either direction, an apron of greater width than the cutting bed secured to the carriage and extending along an edge of the bed, and means for securing an end portion of the material in engagement with the cutting bed and apron against movement heightwise of the bed.

2. A machine for operating upon sheet material comprising a frame, a cutting bed, rollers mounted on the frame, a trough mounted upon the rollers for movement along the front of the machine, tracks on the under side of the trough for guiding the trough in its movement on the rollers, rails carried by the trough and extending beneath and adjacent to the rollers for preventing heightwise movement of the trough, upstanding brackets mounted upon the trough, an apron secured to the upper ends of the brackets and extending along and beyond the forward edge of the cutting bed, and clamping means for securing in fixed position heightwise of the bed an end portion of sheet material extending from the trough over the apron and bed.

LESTER B. HOOPER.